United States Patent Office 3,282,841
Patented Nov. 1, 1966

3,282,841
LUBRICATING OIL COMPOSITION
Pieter H. van der Mey, Amsterdam, Netherlands, assignor to Shell Oil Company, New York, N.Y., a corporation of Delaware
No Drawing. Filed Oct. 4, 1963, Ser. No. 313,772
Claims priority, application Netherlands, Nov. 30, 1962, 286,212
6 Claims. (Cl. 252—51.5)

This invention relates to non-ash forming lubricants which are highly detergent and corrosion resistant and to products and process for the preparation of novel non-ash forming polymeric products which are capable of imparting these desired properties to the base lubricant.

It is known that certain polymers derived from copolymers, one component of which is a polymerizable heterocyclic nitrogen-containing compound such as vinyl pyridine and vinyl pyrrolidone possess good detergent properties. The monomer units in these polymers are randomly distributed and are well known in the art and are fully described in U.S. Patents 2,839,512 and 2,889,282, and British Patent 808,664. Specifically they are random copolymers of vinyl pyridine or vinyl pyrrolidone and esters of $C_{12-18}$ alkyl methacrylate and their mixtures. They are good detergents but in lubricants subjected to wide temperatures and pressures, they lack stability and tend to cause corrosion. Efforts to improve these copolymers by use of auxiliary additives such as metal salts, e.g. metal sulfonates or phosphates has not been too successful.

It has now been discovered that stability, as well as anti-corrosive and anti-wear properties can be imparted to copolymers of polymerizable 5- and 6-membered heterocyclic nitrogen-containing compounds and polymerizable nitrogen-free monomers containing oleophilic groups by polymerizing said monomers under conditions so as to form block polymers, each block being built up of only one monomer. Block polymers of the present invention prepared by the process described below result in products which are superior as detergents, corrosion and wear inhibitors, to similar polymers but which have random or statistical distribution of the monomer units making up the final copolymer product.

The invention therefore is directed to the preparation of block polymers for lubricants, which contain one or more blocks of nitrogen-free oleophilic containing groups together with one or more polar blocks formed from a vinyl compound having the formula

(I)

in which the symbols $R_1$ and $R_2$ stand for a hydrogen atom or an alkyl group and R for a heterocyclic radical that has the group C=N in a five-membered or six-membered ring and that may carry one or more hydrocarbon groups as substituent(s).

Monomers used to form block containing oleophilic groups include nitrogen-free polymerized monomers containing hydrocarbyl groups of six or more carbon atoms such as esters of unsaturated aliphatic mono- or dicarboxylic acids and saturated alcohols with a straight or branched chain of at least 6 carbon atoms, esters of unsaturated alcohols and saturated carboxylic acids with a straight or branched chain of 6 or more carbon atoms, unsaturated ethers with a saturated hydrocarbon group with a straight or branched chain of 6 or more atoms, and olefins with a straight or branched chain of 8 or more carbon atoms. These oleophilic-containing monomers can be admixed with monomers having no oleophilic group and from which blocks with oleophilic properties can be formed are, such as, lower mono-olefins, such as ethylene, propylene, and the butylenes, mono-olefins with activated double bond, for instance styrene, and styrene substituted at the alpha carbon atom or in the nucleus, such as alpha-methyl styrene, unsaturated ethers and ketones with short hydrocarbon groups and unsaturated esters with short hydrocarbon groups. Conjugated dienes, for instance butadiene and isoprene, are also suitable; and it is not necessary to saturate with hydrogen the double bonds remaining in the block polymer in order to secure the oxidation stability of the block polymer.

Preferred oleophilic-containing monomers are esters of unsaturated aliphatic mono- and dicarboxylic acids and straight or branched-chain alkanols having from 6 to 20 carbon atoms such as $C_{10-18}$ alkyl acrylates, vinyl esters of $C_{12-18}$ aliphatic monocarboxylic acid, $C_{10-18}$ alkyl maleate or fumarate, etc.

The nitrogen-containing monomer which is used to form the other block units are vinyl compounds represented by Formula I above in which the symbol R stands for a heterocyclic radical that has the C=N group in a five-membered or six-membered ring and that may carry one or more hydrocarbon groups as substituent(s). Such heteocyclic radicals also include bicyclic radicals of which one of the rings has the C=N group in the ring, which ring carries the vinyl group.

The hydrocarbon groups that can be present as substituent attached to the heterocyclic radical, are, for instance, alkyl groups, in particular methyl and/or ethyl groups and/or propyl or isopropyl groups.

The $R_1$ and $R_2$ groups of the vinyl compound from which the polar blocks are built up are, for instance, both methyl groups. Vinyl compounds in which one of the substituents $R_1$ and $R_2$ is a hydrogen atom and the other an alkyl group, are also suitable, for instance, vinyl compounds in which $R_1$ is a methyl group and $R_2$ a hydrogen atom.

The polar blocks are preferably built up of units having the Formula II is represented by R—CH=$CH_2$, in which R has the meaning given above and the vinyl radical (—CH=$CH_2$) can be attached to the nitrogen or to a carbon atom in the radical R. Examples of such units are the vinyl derivatives of oxazole, isoazole, thiazole, isothiazole, 1,2,4-oxadiazole, 1,2,5-oxidiazole, 1,3,4-oxadiazole, 1,2,3,4-oxatriazole, 1,2,3,5-oxatriazole, benzthiazole, pyridine, quinoline, isoquinoline, and of the diazines and their homologues.

The following examples illustrate the preparation of block polymers of the present invention.

Preference is given to polar blocks that are built up of units of 2-vinyl thiazole, 2-vinyl pyridine, 4-vinyl pyridine, 2-vinyl pyrimidine or 4-vinyl pyrimidine.

In comparison with the heterocyclic nitrogen-containing polar blocks the oleophilic blocks are built up of a relatively large number of monomeric units. The number of units in all the oleophilic blocks together that is needed, as referred to the number of polar units, to secure solubility in the lubricant depends on the monomers used in the oleophilic blocks and on the polarity of the polar blocks. The number of units thus required for solubility can easily be determined experimentally. As a rule this number corresponds to at least three for every polar unit.

The polar block preferably has from two to ten polar units.

The block polymer may be built up of only 1 polar and 1 oleophilic block. The block polymer may also contain several polar and/or oleophilic blocks. In addition, a small block or a radical originating from the initiator may be present in the block polymer in a terminal or central position.

The block polymer may be prepared by polymerizing one of the nonomers to the desired degree of polymerization and, subsequently, initiating, with the homopolymer obtained, the polymerization of another type of monomer. Another possibility is a method of preparation according to which homopolymers of oleophilic and polar monomers are coupled to each other. If then both the homopolymers have two reactive terminal groups, a block polymer with a variable number of blocks is formed; if one of the homopolymers has two reactive terminal groups and the other only one, a block polymer consisting of three blocks is formed.

Preparation of the block polymers by means of anionic polymerization is preferred. An alkali metal or an alkali metal compound of a hydrocarbon is then used as the initator. If such an initator and one of the monomers are combined, a polymer is formed of which one or either of the terminal groups is a carbanion, or, depending on the solvent applied, a carbon-metal bond.

Suitable initators for the anionic polymerization are the metals sodium, potassium, lithium, rubidium, cesium and their hydrocarbon compounds, for instance, sodium naphthalene, butyl lithium, $Na_2$ (alphamethyl styrene)$_4$, benzyl sodium and phenyl isopropyl potassium.

The solvent used must be a proton-free one, for instance, tetrahydrofuran, benzene, hexane, dimethoxyethane and others.

As to whether a polar or non-polar solvent is chosen the guiding factor is generally the nature of the monomer that has to form the oleophilic block. When, for instance, a diolefin is used a non-polar solvent is preferably chosen, because in this mainly 1,4-polymerization takes place and thus the formation of a chain with tertiary hydrogen (after addition of hydrogen on to the C=C bonds in the oleophilic block) is avoided. When the oleophilic block is prepared from, for instance, methacrylate esters, polar solvents are preferably chosen, such as tetrahydrofuran and dimethoxyethane, because in applying this type of monomer in a polar solvent a narrow distribution of molecular weight is obtained.

In anionic polymerization the preparation is carried out in an axygen-free and anhydrous medium at a temperature of from −80° C. to +70° C. The formation of an oleophilic block from a diolefin is preferably effected at room terperature or higher, because at lower temperatures the rate of polymerization is slow. With methacrylate esters a polymerization temperature of −30° C. or less is applied, because at higher temperatures termination reactions become perceptible.

It has been found that it is advantageous to allow the polar block to be formed at a temperature of 30° C. or less; at higher temperatures not all the polar monomer added is incorporated in the polar block.

In anionic preparation of the block polymer one possibility would be first to have the oleophilic block formed and then to add the polar monomer to the living homopolymer, by which the polar block is caused to grow on to the oleophilic block. The reverse might be another possibility. The choice between these two courses is determined by the respective anionic polymerizabilities of the polar monomer and the monomer forming the oleophilic block. As a measure of such polymerizability has been suggested, for instance, the localization energy, calculated by simple quantum-mechanical approximation methods (T. Fueno, T. Tsurutama and J. Furukawa, J. Polymer Sci. 40 (1959), 499–510). The monomer having the lower polymerizability should be polymerized first, the monomer with the higher polymerizability then being added to the living monomer produced. If the polymerizabilities of the respective monomers are equal, either order is possible and block polymers with alternate blocks can be obtained.

The localization energies $L_\beta^-$ of some of the monomers applied are given in the following Table I (high $L_\beta^-$=low polymerizability).

TABLE I

| Monomer: | $L_\beta^-$ |
|---|---|
| Butadiene | 1.644 |
| Isoprene | 1.645 |
| Styrene | 1.704 |
| Alpha-methyl styrene | 1.843 |
| Lauryl methacrylate | 1.511 |
| Lauryl acrylate | 1.428 |
| 2-vinyl pyridine | 1.628 |
| 4-vinyl pyridine | 1.630 |
| 2-vinyl pyrimidine | 1.561 |
| 4-vinyl pyrimidine | 1.567 |

The block polymers according to the invention are suitable for use as additives for lubricants of different nature. In the first place mineral lubricating oils of various viscosities may be mentioned. Synthetic lubricating oils are also suitable, however, as well as lubricating oils containing fatty oils. The products can also be incorporated in lubricating greases.

The block polymers can be added to the lubricant as produced or else as a concentrate obtained by mixing them with a little of a lubricating oil.

The block polymers of this invention can be used in lubricating oils in amounts ranging from about 0.1% to about 5% by weight, preferably from about 0.5% to about 3% by weight.

When desired, additional improvements with respect to oxidation stability and scuffing inhibition can be imparted to the oil compositions containing the polymer salts of this invention by incorporating small amounts (0.01%–2%, preferably 0.1%–1%) of phenolic antioxidants such as alkylphenols, e.g. 2,6-ditertbutyl-4-methylphenol or p,p′-methylene bisphenols such as 4,4′-methylene bis(2,6-ditertbutyl phenol) or arylamines such as phenyl-alpha-naphthylamine. Antiscuffing agents include organic phosphites, phosphates, phosphonates and their thio-derivatives, such as tri($_{3-18}$ alkyl phosphites), or phosphates, e.g. tributyl, octyl, lauryl, stearyl, cyclohexyl, benzyl, cresyl, phenyl phosphites or phosphates, as well as their thio-derivatives, $P_2S_5$-terpene reaction products, e.g. $P_2S_5$-pine oil reaction products, and alkali metal salts thereof such as potassium salt of a $P_2S_5$-terpene reaction product, phosphates such as dibutyl trichloromethane-phosphonate, dibutyl monochloromethanephosphonate, and the like. The triphenyl, tricresyl and tristearyl ortho-phosphates or potassium salt of $P_2S_5$-terpene reaction product are preferred.

Lubricating oils for additives of this invention can be any natural or synthetic material having lubricating properties. Thus, the base may be a hydrocarbon oil of wide viscosity range, e.g. 100 SUS at 100° F. to 15 SUS at 210° F. The hydrocarbon oils may be blended synthetic lubricants such as polymerized olefins, organic esters of poly-basic organic and inorganic acids, e.g. di-2-ethylhexyl sebacate; polyalkyl silicone polymers, e.g. dimethyl silicone polymer, and the like. If desired, the synthetic lubricants may be used as the sole base lubricant.

EXAMPLE I.—PREPARATION OF BLOCK POLYMER OF LAURYL METHACRYLATE AND 2-VINY PYRIDINE; NUMBER OF POLAR UNITS: 7 PER BLOCK

To a dispersion of 1 part by weight of sodium in 220 parts by weight of tetrahydrofuran was added at room temperature 3.2 parts by weight of alpha-methyl styrene. The deep-red tetrameric dianion of alpha-methyl styrene was at once formed. An hour after the start of this reaction the solution was separated by filtration from the excess of sodium metal. The solution of sodium alpha-methyl styrene tetramer was used as the initiator in the polymerization of 2-vinyl pyridine. By washing it with caustic soda the latter monomer had been freed from inhibitors and also been made anhydrous and oxygen-free. By means of vacuum distillation 10.0 parts by weight of this purified 2-vinyl pyridine were added to the solution of sodium alpha-methyl styrene tetramer, which was rapidly stirred and kept at −60° C. by cooling. Only a few minutes after conclusion of the distillation a deep-red polymeric dianion of 2-vinyl pyridine was obtained in a yield of 100%, having the structure:

$$^-Na(2\text{-vinyl pyridine})_7(\text{alpha-methyl styrene})_4$$
$$(2\text{-vinyl pyridine})_7^-Na^+$$

The solution of the polymeric dianion of 2-vinyl pyridine was rapidly added to a solution, cooled at −60° C., of 127 parts by weight of lauryl methacrylate in 888 parts by weight of tetrahydrofuran. The red color at once disappeared; a pale yellow solution was obtained. At the end half an hour the polymer was terminated by the addition of 8 parts by weight of isopropanol. The reaction mixture was poured into 8000 parts by weight of methanol and the precipitated polymer separated by filtration. 141 parts by weight (100% yield) were obtained, with a nitrogen content of 0.96% w., having the structure:

$$(\text{lauryl methacrylate})_{37}(2\text{-vinyl pyridine})_7(\text{alpha-methyl styrene})_4(2\text{-vinyl pyridine})_7(\text{lauryl methacrylate})_{37}$$

EXAMPLE II.—PREPARATION OF A BLOCK POLYMER OF LAURYL METHACRYLATE AND 2-VINYL PYRIDINE; NUMBER OF POLAR UNITS: 3 PER BLOCK

In the same manner as described in Example I a block polymer was prepared having the structure (lauryl methacrylate)$_{37}$(2 - vinyl pyridine)$_3$(alpha-methyl styrene)$_4$ (2-vinyl pyridine)$_3$(lauryl methacrylate)$_{37}$ and a nitrogen content of 0.42% w., starting from 3.2 parts by weight of alpha-methyl styrene, 4.3 parts by weight of 2-vinyl pyridine and 127 parts by weight of lauryl methacrylate. The yield was 100%.

EXAMPLE III.—PREPARATION OF BLOCK POLYMER OF LAURYL ACRYLATE AND 4-VINYL PYRIDINE

The solution of 2.3 parts by weight of cumyl potassium (phenyl isopropyl potassium) in 220 parts by weight of tetrahydrofuran was cooled at −80° C. To the solution was added by means of vacuum distillation 10.5 parts by weight of 4-vinyl pyridine. By washing it with caustic solution the 4-vinyl pyridine had previously been freed from inhibitors and also been made anhydrous and oxygen-free. Polymerization proceeded very rapidly and produced, in a yield of 100%:

$$\text{cumyl-(4-vinyl pyridine)}_7^-K^+$$

The solution of this polymeric anion was quickly added to a solution, cooled at −80° C., of 120 parts by weight of lauryl acrylate in 1320 parts by weight of tetrahydrofuran. The deep-red color of the pyridine ion at once disappeared. After half an hour's stirring at −80° C. the polymer was terminated by the addition of 8 parts by weight of isopropanol. The reaction mixture was poured into 8000 parts by weight of methanol and the precipitated polymer separated by filtration. The yield of polymer was 120 parts by weight having the structure:

$$\text{cumyl-(4-vinyl pyridine)}_7(\text{lauryl acrylate})_{37}$$

the nitrogen content was 0.99% w.

EXAMPLE IV.—BLOCK POLYMER WITH AN ETHENE/PROPENE POLYMER AS OLEOPHILIC GROUP

A solution of 2.3 parts by weight of cumyl potassium in 220 parts by weight of tetrahydrofuran was cooled at −80° C. To this solution was added by means of vacuum distillation 7.5 parts by weight of 2-vinyl pyridine. By washing it with caustic soda the 2-vinyl pyridine had previously been freed from inhibitors and had also been made anhydrous and oxygen-free. Polymerization proceeded very rapidly and produced, in a yield of 100%:

$$\text{cumyl-(2-vinyl pyridine)}_5^-K^+$$

The solution of this polymeric anion was slowly added to a solution of 1300 parts by weight of tetrahydrofuran of 111 parts by weight of chlorinated copolymer of ethylene and propylene with a molecular weight of 8000 and a chlorine content of 0.40% w., in which the molar ratio ethylene propylene was as 7:3. This copolymer solution was anhydrous and oxygen-free. During admixture the temperature of the mixture was maintained at 20° C. The deep-red color of the pyridine ion changed to yellow. Colloidal potassium chloride was formed (Tyndall effect).

After half an hour's stirring at 20° C. the block polymer was terminated by the addition of 8 parts by weight of isopropanol. The reaction mixture was poured into 8000 parts by weight of methanol, the precipitated material being removed by filtration. The solvents were removed from the filtrate by evaporation; the residue was dissolved in twice the quantity by weight of benzene. This solution was poured into 5000 parts by weight of methanol. The precipitated block polymer was obtained by filtration. The yield was 30 parts by weight of block polymer having a nitrogen content of 0.7% w.

EXAMPLE V.—BLOCK POLYMER OF CETYL ALPHA-METHYL STYRENE AND 2-VINYL PYRIDINE

From 3.2 parts by weight of alpha-methyl styrene in 220 parts by weight of tetrahydrofuran was prepared, in the manner described in Example I, a solution of the tetrameric dianion, with sodium as the counter ion. To the solution was added at room temperature an oxygen-free and anhydrous solution of 28.8 parts by weight of alpha-methyl styrene in 220 parts by weight of tetrahydrofuran. The mixture was then cooled down to −80° C., at which temperature the tetrameric dianion polymerized further with the alpha-methyl styrene added. At the end of one hour a 100% yield had been obtained of a polymer having the formula $$Na_2(\text{alpha-methyl styrene})_{40}^{--}$$

Subsequently, at −80° C., 7.1 parts by weight of 2-vinyl pyridine was added that had been made oxygen-free and anhydrous. There was a color change from brownish red to purple. In 15 minutes at −80° C. a block polymer had been formed with the formula:

$$^-(2\text{-vinyl pyridine})_5(\text{alpha-methyl styrene})_{40}$$
$$(2\text{-vinyl pyridine})_5^-$$

which was terminated by the addition of 8 parts by weight of isopropanol. The reaction mixture was poured into 8000 parts by weight of methanol; the precipitated block polymer was obtained by filtration. The yield was 100%. The nitrogen content of the block polymer was 2.4% w.

This block polymer was alkylated in the phenyl nuclei of the alpha-methyl styrene block with cetene-1 as follows:

11.23 parts by weight of block polymer was dissolved in 100 parts by weight of o-dichloro-benzene. In the course of 15 minutes the solution was saturated with hydrogen chloride by passing in dry HCl gas at room temperature. 0.5 part by weight of nitrobenzene, 5.7 parts by weight of anhydrous aluminum chloride and 17.7 parts by weight of cetene-1 were then added. The mixture was stirred for 17 hours at room temperature. The reaction mixture was diluted with 1600 parts by weight of methanol containing 2% w. of hydrogen chloride. After the precipitate had settled the liquid layer was removed, the precipitate washed three times with 200 parts by weight of methanol and three times with 1200 parts by weight of methanol mixed with 12 parts by weight of alcoholic 1 N caustic soda solution. Subsequently, the washed precipitate was taken up into 800 parts by weight of benzene, the insoluble salt was filtered off and the filtrate evaporated to dryness. The yield was 14.0 parts by weight of alkylated block polymer, the nitrogen content was 0.93% w. The product was soluble in lubricants.

Block polymers of this invention can be also used in fuels, e.g. gasoline, fuel oils, greases, asphalts and oil-water emulsions.

The outstanding properties which block polymers of this invention are capable of imparting to lubricating oils are shown from engine test data presented below.

*Engine tests*

The additives according to the invention were tested in a Gardner diesel engine and in a Petter gasoline engine. The test results were compared with those of a copolymer of lauryl methacrylate and 5-vinyl-2-methyl pyridine having a nitrogen content of 0.59% w. and a random or statistical distribution of the oleophilic groups and the polar groups along the polymeric chain; the latter co-polymer had been made on a technical scale by copolymerization, up to 100% conversion at 120° C. and using ditertiary butyl peroxide as the initiator, of a mixture containing 5% w. of methyl-5-pyridine, 14% w. of methyl methacrylate, 51% w. of technical lauryl methacrylate with an equivalent weight of 265, and 30% w. of technical stearyl methacrylate with an equivalent weight of 315.

The concentration of the additives in the doped lubricant was 1.5% w.; the base oil used was a solvent-refined paraffinic lubricating oil distillate. The viscosity of the base oil was 7.2 cs. at 98.9° C. in the Petter test and 11.5 cs. at 98.9° C. in the Gardner test.

*Gardner diesel engine*

Water-cooled one-cylinder four-stroke engine, bore 108 mm., stroke 152.4 mm., piston displacement 1.4 liters, power output 11 H.P. at 2100 r.p.m. The duration of the test was 17 hours. The fuel was a gas oil having a sulfur content of 0.9% w. The temperature of the cooling water was 80° C. In this engine the piston fouling was rated.

*Petter gasoline engine*

Water-cooled four-cylinder four-stroke engine, bore 85 mm., stroke 82.5 mm., piston displacement 468 ml., compression ratio 10.0:1; power output 3.5 H.P. at 1500 r.p.m. The duration of the test was 48 hours. The fuel was a motor gasoline with 0.32 ml., TEL (61.48% w. tetraethyl lead, 18.81% w. dichloroethane, 17.86% w. dibromoethane—balance coloring matter and kerosene) per liter and a sulfur content of 0.05% w. The temperature of the cylinder cooling water was 80° C., that of the cooling water of the cooled timing gear lid 24° C. In this test the degrees of piston fouling and sludge formation were rated.

The results of the engine tests are given in Table II.

TABLE II

| Additive | Gardner diesel piston cleanliness (10=clean) | Petter gasoline engine | |
|---|---|---|---|
| | | Sludge formation (10=clean) | Piston cleanliness (10=clean) |
| Example I | 8.8 | 8.5 | 6.7 |
| Example II | 8.8 | 9.0 | 7.2 |
| Random or "statistical" copolymer of 2-methyl-5-vinyl pyridine/lauryl methacrylate | 7.0 | 9.0 | 5.8 |
| None | 4.5 | 6.5 | 4.7 |

It is evident from the tests that the three additives are well capable of inhibiting sludge formation in the Petter gasoline engine, but that the detergent effect of the random or "statistical" copolymer is, in both engines, surpassed by that of the block polymers of the present invention.

Compositions of the present invention can be used to effectively lubricate automotive and truck engines as well as various industrial equipment such as earth movers, tractors and mining machinery.

I claim as my invention:

1. A lubricating oil composition comprising a major amount of lubricating oil and minor amount of block copolymer containing blocks of nitrogen-free units containing oleophilic alkyl radicals of from 6 to 20 carbon atoms selected from the group consisting of alkyl methacrylate, alkyl-substituted alpha-methyl styrene, and alpha-olefin and blocks of heterocyclic nitrogen-containing units selected from the group consisting of vinyl pyridine and vinyl pyrimidine, the block copolymers being formed in the presence of an anionic initiator.

2. A mineral lubricating oil composition comprising a major amount of mineral lubricating oil and from about 0.1% to about 5% of a block copolymer of block units of $C_{10-18}$ alkyl methacrylates and block units of vinyl pyrimidine, the block copolymer being formed in the presence of an anionic initiator, a protein-free solvent and at between minus 80° C. and 70° C.

3. A mineral lubricating oil composition comprising a major amount of mineral lubricating oil and from about 0.1% to about 5% of a block copolymer of block units of $C_{10-18}$ alkyl methacrylates and block units of 2-vinyl pyridine, the block copolymer being formed in the presence of an anionic initiator, a protein-free solvent and at between minus 80° C. and 70° C.

4. A mineral lubricating oil composition comprising a major amount of mineral lubricating oil and from about 0.1% to about 5% of a block copolymer of block units of $C_{10-18}$ alkyl methacrylates and block units of 4-vinyl pyridine, the block copolymer being formed in the presence of an anionic initiator, a protein-free solvent and at between minus 80° C. and 70° C.

5. A mineral lubricating oil composition comprising a major amount of mineral lubricating oil and from about 0.1% to about 5% of a block copolymer of block units of $C_{6-18}$ alkylated alpha-methyl styrene and block units of 2-vinyl pyridine, the block copolymer being formed in the presence of an anionic initiator, a protein-free solvent and at between minus 80° C. and 70° C.

6. A mineral lubricating oil composition comprising a major amount of mineral lubricating oil and from about 0.1% to about 5% of a block copolymer of block units of lauryl methacrylates and block units of 2-vinyl pyridine, the block copolymer being formed in the presence of an anionic initiator, a protein-free solvent and at between minus 80° C. and 70° C.

References Cited by the Examiner

UNITED STATES PATENTS 2,889,282  6/1959  Lorensen et al. _____ 252—51.5
3,067,163  12/1962  Bauer _____ 252—51.5
3,214,498  10/1965  Bauer _____ 260—885

FOREIGN PATENTS 760,554  10/1956  Great Britain.

DANIEL E. WYMAN, *Primary Examiner.*

L. G. XIARHOS, *Assistant Examiner.*